(12) United States Patent
Maruyama

(10) Patent No.: US 7,901,225 B2
(45) Date of Patent: Mar. 8, 2011

(54) CARD CONNECTOR

(75) Inventor: Shinichiro Maruyama, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/992,915

(22) PCT Filed: Oct. 3, 2006

(86) PCT No.: PCT/US2006/038615
§ 371 (c)(1),
(2), (4) Date: Jul. 31, 2009

(87) PCT Pub. No.: WO2007/041576
PCT Pub. Date: Apr. 12, 2007

(65) Prior Publication Data
US 2009/0298316 A1  Dec. 3, 2009

(30) Foreign Application Priority Data
Oct. 3, 2005  (JP) .................................. 2005-200523

(51) Int. Cl.
*H01R 13/62* (2006.01)
(52) U.S. Cl. ...................................... 439/159
(58) Field of Classification Search .................. 439/159, 439/160, 157
See application file for complete search history.

(56) References Cited

U.S. PATENT DOCUMENTS

| | | | |
|---|---|---|---|
| 4,961,710 A | 10/1990 | Komatsu | |
| 6,394,827 B2 * | 5/2002 | Nogami | 439/159 |
| 7,070,452 B2 * | 7/2006 | Harasawa | 439/630 |
| 7,238,034 B2 * | 7/2007 | Matsukawa et al. | 439/159 |
| 2005/0101174 A1 | 5/2005 | Harasawa | |

FOREIGN PATENT DOCUMENTS

| | | |
|---|---|---|
| CN | 200320110671 | 1/2005 |
| DE | 39 16 783 A1 | 4/1990 |
| EP | 1 452 994 A1 | 9/2004 |
| JP | 2003-006576 | 1/2003 |

OTHER PUBLICATIONS

International Search Report for PCT/US2006/038615.

* cited by examiner

*Primary Examiner* — Briggitte R Hammond
(74) *Attorney, Agent, or Firm* — Timothy M. Morella

(57) ABSTRACT

A memory card connector (10) is disclosed that includes a card engaging member (14) in the form of a slider (14) which has a projection (14d) that extends from the slider to engage a retention notch (23) in the memory card (21). The card (21) is engaged when the card is inserted into the connector, and once inserted the card is pushed to release it. A biasing spring (15) is provided to bias the slider (14) in an ejection direction and this biasing spring exerts an ejection force on the slider. The slider engages (11h) a stop formed on the connector housing (11) and the slider (14) tilts to release the slider projection (14d) from the memory card retention notch (23).

4 Claims, 4 Drawing Sheets

CARD CONNECTOR

BACKGROUND OF THE INVENTION

The present invention relates generally to a card connector, and more specifically to a push-push type card connector with improved operational performance.

Conventional electronic devices, such as personal computers, mobile telephones, personal digital assistants (PDAs), digital cameras, video cameras, music players, game machines, and vehicle navigation devices use card connectors that use various types of memory cards, such as subscriber identity module (SIM) cards, multi-media cards (MMCs), secure digital (SD) cards, mini SD cards, xD picture cards, memory sticks, memory sticks Duo, smart media, compact or transflash memory cards, and micro SD cards.

From the aspect of easiness of use, many memory card connectors generally employ a push-push structure which enables an operator to insert the memory card by pushing it, as well as pushing the memory card to remove the card from its connector. In a conventional push-push style card connector, a slide member is provided to engage the memory card and the slide member uses a compression spring. However, the slide member engages the memory card throughout the full length of the push and the operator may encounter difficulty in removing the memory card. In view of this problem, there has been proposed a card connector in which a card lock member is movably attached to a slide member, and at the time of ejection of a memory card, the card lock member moves out of the engagement with the memory card, as shown in Japanese Patent Application Laid-Open (Kokai) No. 2003-6576.

FIG. 5 is a view showing such a conventional card connector where slide member 301 is attached to a side portion of the housing of a card connector. In FIG. 5, the card ejection-insertion slot is located at the bottom of the Figure. Once an engagement projection 303 of the slide member and the card lock member 304 engage the memory card (not shown), the slide member 301 slides (up and down in FIG. 5) while holding the memory card. The slide member 301 is biased by a coil spring 302 toward the direction of ejection of the memory card (downward in FIG. 5). A recess 305 is provided in the upper surface of the slide member 301, and the card lock member 304 is accommodated within this recess. The upper end of the card lock member 304 is pivoted to the slide member 301, so that the card lock member 304 rotates about its upper end.

An engagement portion 304a is formed on the lower end of the card lock member 304 and it projects toward the interior of the housing through an opening 306 that is formed in a wall portion in the left side of the recess 305. Thus, the engagement portion 304a comes into engagement with a concave portion, or notch, on the side surface of the memory card.

The distal end of the engagement portion 304a projects toward the bottom surface of the housing and engages an angled surface 308 that is formed on the side surface of a card guide 307 formed on the bottom surface of the housing. Therefore, when the slide member 301 is moved toward the card ejection direction by means of the coil spring 302 when the memory card is ejected from the housing, the distal end of the engagement portion 304a moves along angled surface 308, and the engagement portion 304a moves away from the side surface of the memory card. As a result, the engagement portion 304a is disengaged with the memory card notch so that engagement of the memory card by the slide member 301 is canceled, and the memory card can be easily removed.

However, this card connector has a complex structure, which increases cost, because the card lock member 304 must be rotatably attached to the upper surface of the slide member 301. Furthermore, the card connector requires a mechanism for moving the engagement portion 304a of the card lock member 304, which makes it more complex, and increases the cost of the connector, as well as the size of the housing.

The present invention is directed to a card connector that has an improved structure and which overcomes the above disadvantages.

SUMMARY OF THE INVENTION

It is therefore a general object of the present invention to provide a memory card connector which is simple in structure, and which is reduced in cost and size, and from which a card can be easily removed. In the card connector of the present invention, a slide member, which includes an integrally formed engagement portion for engagement with a card, is provided. The slide member is configured such that a position at which the slide member comes into contact with a stopper portion is offset from a position at which the slide member receives urging force from an urging member. By virtue of this configuration, when a memory card is ejected from the connector, the slide member can reliably release the card, without the need for a separate mechanism for disengaging the slide member and the memory card.

Specifically, the present invention provides a card connector that includes a housing for accommodating a memory card, a plurality of terminals supported by the housing for contacting contacts of the memory card. A card guide mechanism is provided which includes a slide member that slides while holding the memory card as it is inserted into the connector housing. It also includes a biasing or urging member for biasing the slide member in a direction opposite that of the insertion direction of the memory card. The card guide mechanism moves the slide member from an end point in the direction opposite the insertion direction by means of biasing force of the biasing member so as to eject the card.

The slide member includes: a card-pushing portion which engages the card and transmits a pushing force thereto; a card lock portion which engages a retention notch of the card; a biasing force receiving portion on which the biasing force of the biasing member acts; and, a stopper butting portion engages a stopper portion of the housing so as to stop movement of the slide member in a direction opposite the insertion direction. The card-pushing portion, the card lock portion, the biasing force receiving portion, and the stopper butting portion are all formed integrally with the slide member, and the biasing force receiving portion and stopper butting portion are offset from each other.

The present invention also provides, in an alternate embodiment, a card connector with a housing for accommodating a memory card; terminals mounted on the housing for contacting the memory card; and a card guide mechanism. The card guide mechanism includes a slide member that slides while it holds the memory card inserted into the housing, and an urging member for urging the slide member opposite the insertion direction of the card. The card guide mechanism stops the slide member at a card lock position. When the slide member moves in the insertion direction and reaches an end point as a result of pushing the card in the insertion direction, the card guide mechanism moves the slide member from the end point in a direction opposite the insertion direction by way of a biasing force that is applied by the biasing member so as to eject the card.

The slide member is provided with a slide cam portion in engagement with a fixed cam, a card-pushing portion which comes into engagement with the memory card and transmits pushing force thereto, a card lock portion which engages a retention notch of the card, a biasing force receiving portion on which the biasing force of the biasing member acts, and a stopper butting portion which comes into engagement with a stopper portion of the housing so as to stop movement of the slide member in the direction opposite the insertion direction. The slide cam portion, the card-pushing portion, the card lock portion, the urging force receiving portion, and the stopper butting portion are formed integrally with the slide member, and the urging force receiving portion and stopper butting portion are offset each other.

Importantly, when the stopper butting portion comes into engagement with the stopper portion of the housing and the slide member stops movement in the direction opposite the insertion direction, the slide member tilts and releases the memory card from its held in place state within the connector. When the slide member tilts, the card lock portion disengages from the retention notch of the card. Preferably, the tilt of the slide member is restricted by a tilt-limiting portion of the housing.

In the card connector of the present invention, the slide member includes an integrally formed engagement portion for engagement with a memory card, is configured such that a position at which the slide member contacts the stopper portion is offset from a position at which the slide member receives a biasing force from a biasing member. By virtue of this configuration, when a memory card is ejected, the slide member can release the card without the need for a separate mechanism for disengaging the slide member and the memory card. Accordingly, the card connector of the present invention is simple in structure, can reduce cost and size, and facilitates removal of a card therefrom.

BRIEF DESCRIPTION OF THE DRAWINGS

Reference will be made during the course of the following detailed description to the following drawings in which.

DETAILED DESCRIPTION OF PREFERRED EMBODIMENT

Figure 5:
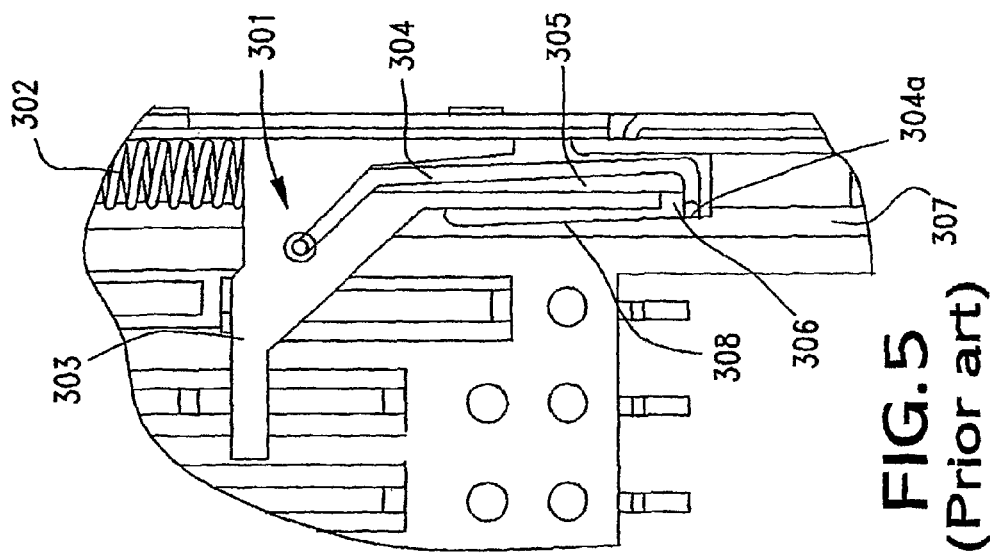

An embodiment of the present invention will next be described in detail with reference to the drawings.

In the drawings, a card connector 10 is illustrated. A memory card 21 is inserted into the interior of the card connector 10, by way of a card insertion slot so that the memory card 21 is connected electrically to the electronic device that contains the card connector 10. The electronic device may be any type of device, such as a personal computer, a mobile telephone, a PDA, a digital camera, a video camera, a music player, a game machine, or a vehicle navigation device.

The card 21 may be any type of IC card; for example, an MMC, SD, mini SD card, xD picture card, memory stick, memory stick Duo, smart media, trans or compact flash memory card, or micro SD card. However, in this description, the present invention shall be described in terms of its use in accommodating a micro SD card. In the description of the present embodiment, terms for expressing direction, such as up, down, left, right, front, and rear, are for explaining the structure and action of portions of the card connector 10. However, these terms represent respective directions in which the card connector 10 is shown in the drawings, and must be construed to represent corresponding different directions when the orientation of the card connector 10 is changed.

Figure 2:
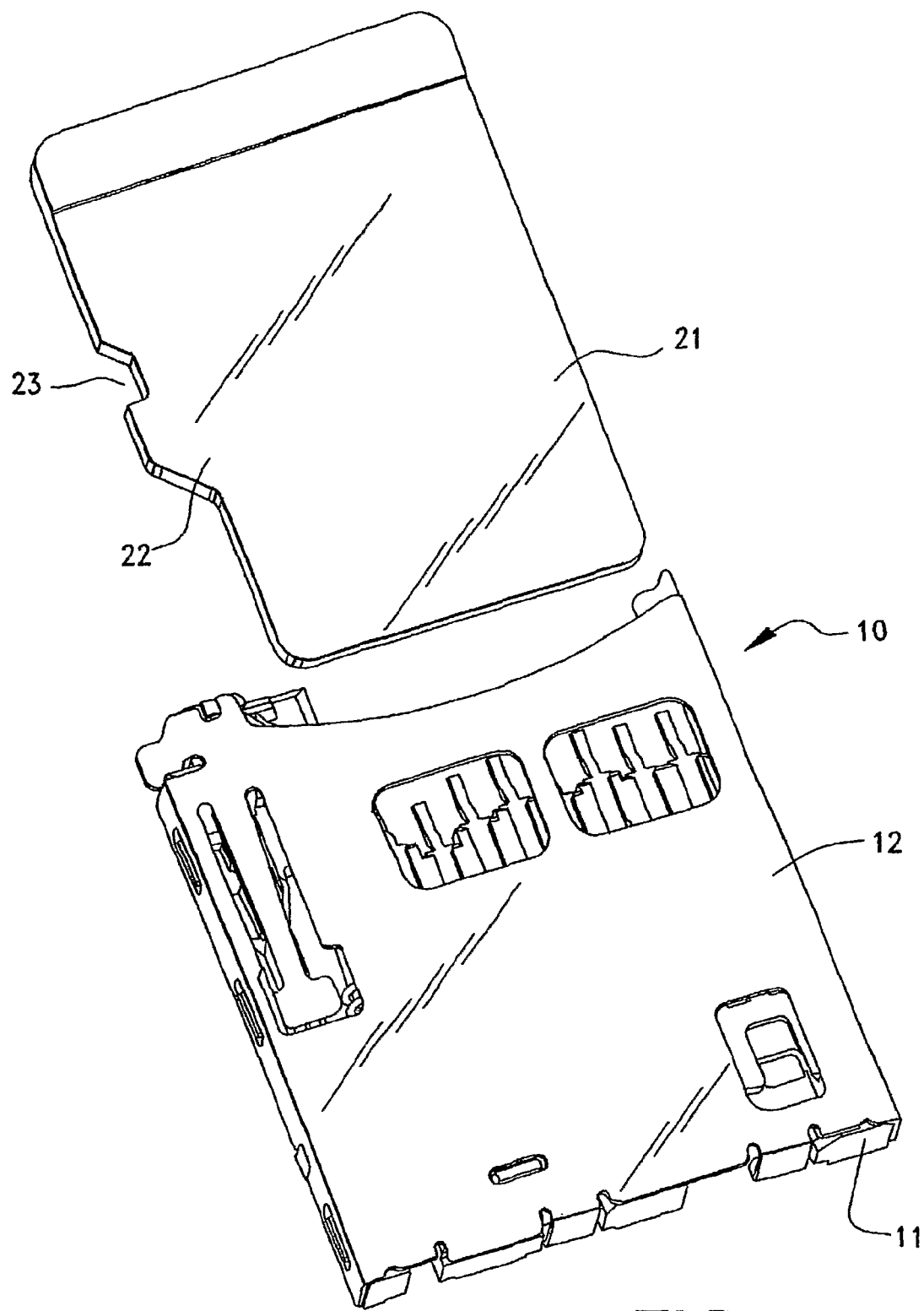
FIG. 2 is a perspective view of the card connector of FIG. 1, but with its outer shell in place and with a memory card aligned with the connector slot, and ready for insertion therein.

As shown in FIG. 2, the card connector 10 has a housing 11 formed from an insulative material, and which receives the memory card 21. It also includes a conductive outer shell 12 which is attached to an upper side of the housing 11. The card connector 10 has a generally flat, parallelepiped shape, and is attached to its electronic device by known means. The memory card 21 is inserted from the front of the connector 10, shown as the upper left side in FIG. 2.

Figure 1:
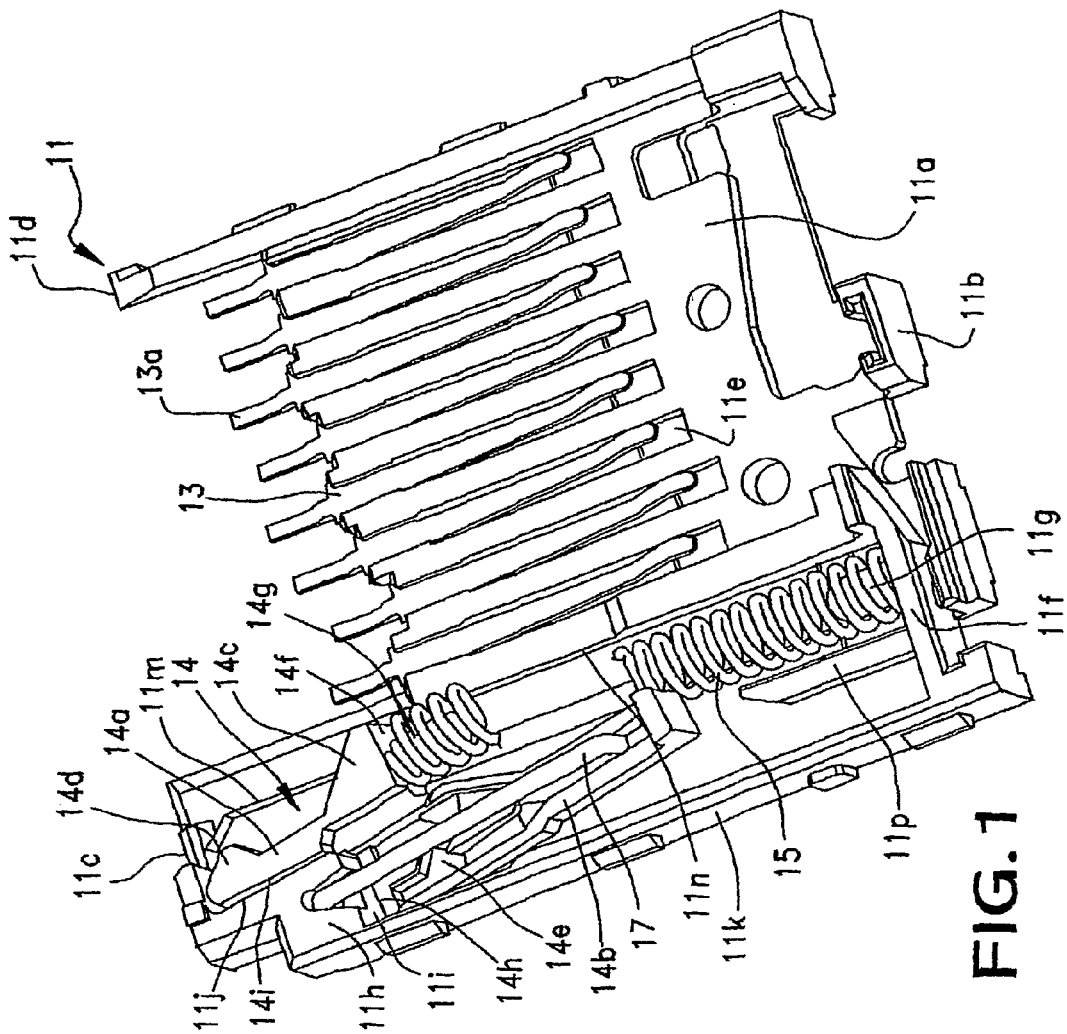
FIG. 1 is a perspective view of one embodiment of a memory card connector constructed in accordance with the principles of the present invention with its outer shell removed for clarity.

FIG. 1 illustrates the connector 10 with the shell 12 removed for clarity. In FIG. 1, the housing 11 has a bottom wall 11a having a generally U-shaped cutaway extending from its front edge (the upper side in FIG. 1). The housing 11 has a rear wall 11b that extends along the rear edge of the bottom wall 11a and extends upright from the bottom wall 11a. A plurality of terminal-mounting grooves 11e are formed on the upper surface of the bottom wall 11a such that the grooves extend in a front-rear direction of the housing. Conductive terminals 13 are received in the terminal-mounting grooves 11e. Body portions of the terminals 13 lie in the terminal-mounting grooves 11e and may be fixed to housing at that location.

Distal end portions of the terminals 13 extend obliquely upward and toward the rear wall 11b such that the distal end portions project upward from the upper surface of the bottom wall 11a. The distal end portions of the terminals 13 serve as contact portions for contacting contact pads provided along a bottom surface of the card 21. Solder tail portions 13a extend from the terminal base portions and are typically connected, by means of soldering or any other suitable process, to counterpart terminal members of the electronic device.

The housing 11 includes a first side wall 11c extending along one side edge of the bottom wall 11a in the front-rear direction (along the left-hand side in FIG. 1), and a second side wall 11d extending along the opposite side edge (the right side of FIG. 1) of the bottom wall 11a in the front-rear direction.

The card connector 10 is of a the push-in and push-out type or "push-push" type which requires pushing the card 21 inward to insert it into the connector 10 and pushing it inward again to remove the card from the connector 10. In order to guide the card in its movement in and out of the connector, a card guide mechanism is provided and includes a slide member 14 that is attached to the first side wall 11c such that it can slide in the front-to-rear direction; i.e., the insertion direction of the card 21.

The slide member 14 includes a card-holding portion 14a for holding the memory card 21, and a slide cam portion 14b, which serves as a slide cam of a cam mechanism for enabling the push-push type operation. The card-holding portion 14a and the slide cam portion 14b are integrally formed as a single member. The card-holding portion 14a includes a card-pushing portion 14c and a card lock portion 14d. The card-pushing portion 14c engages a front edge with respect to the insertion direction) of a projecting portion 22 formed on a side surface of the card 21 (FIG. 2) so as to transfer pushing force thereto. The card lock portion 14d engages a concave retention notch 23 formed on a side of the memory card 21 and is located rearward of the projecting portion 22 with respect to the insertion direction of the card.

The card-pushing portion 14c and the card lock portion 14d are integrally formed as portions of the card-holding portion 14a such that they project toward the interior of the housing 11. The slide member 14 holds the card 21 by the card-pushing portion 14c and the card lock portion 14d of the card-holding portion 14a, and moves in the front-rear direction (i.e., the card insertion direction) together with the memory card 21.

A front end surface of the card-holding portion 14a with respect to the insertion direction of the card 21 functions as a biasing force receiving portion, or shoulder 14f for receiving a biasing force of a biasing member 15 formed of a coil spring, and has an engagement projection 14g, with which one end of the biasing member 15 is engaged. The other end of the biasing member 15 is attached to an engagement portion 11f of the rear wall 11b. Notably, the engagement portion 11f also has an engagement projection 11g, with which the biasing member 15 is engaged. With this configuration, the slide member 14 is biased, or urged toward the direction opposite the insertion direction of the card 21; i.e., the direction of ejection of the card 21.

The slide cam portion 14b is connected to an outer side surface (i.e. a side surface facing the outside of the housing 11) of the card holding portion 14a, and extends frontward with respect to the insertion direction of the card 21. A cam groove (slide cam) 14e is formed on the upper surface of the slide cam portion 14b, and one end of an elongated pin member (fixed cam) 17 is in engagement with the cam groove 14e. The other end of the pin member 17 is in pivotal engagement with the upper surface of a stopper portion 11h formed at the front end of the first side wall 11c of the housing 11. The pin member 17 and the cam groove 14e cooperate to cause the slide member 14, which moves together with the card 21, to perform the push-push operation.

By virtue of this configuration, when the card 21 moves in the card insertion direction and reaches an end point as a result pushing the card 21 in the insertion direction, the card guide mechanism is able to move the card 21 from that end point in a card ejection direction, which is opposite to the card insertion direction, and eject it by means of the biasing member biasing force. Notably, since the cam mechanism which includes the pin member 17 and the cam groove 14e for performing push-push operation is well known, its description is omitted.

The front end surface of the stopper portion 11h with respect to the insertion direction of the card 21 serves as a stopper surface 11i for stopping the slide member 14, which moves so as to eject the card 21. When the slide member 14 is moved in the card ejection direction by the biasing urging member 15 and thus the card 21 is ejected, a stopper butting portion, or stop block, 14h of the slide member 14 engages the stopper surface 11i of the stop, or stopper portion 11h of the housing, whereby the slide member 14 is stopped in its movement. Notably, the stopper butting portion 14h is the rear end surface of the slide cam portion 14b with respect to the insertion direction of the card 21.

FIG. 1 shows an initial state before the card 21 is inserted into the card connector 10. In this state, the slide member 14 is urged by the biasing force of the biasing member 15 in a card ejection direction (opposite the card insertion direction) and the slide member is pressed against the stopper portion 11h, whereby the slide member 14 stops. The biasing force receiving portion 14f for receiving the biasing member 15 is the end surface of the card-holding portion 14a, the stopper butting portion 14h which butts against the stopper surface 11i of the stopper portion 11h is the end surface of the slide cam portion 14b, which is connected to the outer side surface of the card-holding portion 14a. That is, the stopper butting portion 14h is laterally shifted from the biasing force receiving portion 14f with respect to the acting direction of the biasing force of the biasing member 15 (the front-rear direction of the housing 11).

In other words, the biasing force receiving portion 14f, which is the acting point of the biasing force received from the biasing member 15, and the stopper butting portion 14h, which is the acting point of reaction of the biasing force received from the stopper portion 11h, are offset from each other. Therefore, a rotational moment which rotates the slide member 14 counterclockwise as viewed from above is generated, and the slide member 14 is rotated counterclockwise, so that the slide member 14 is tilted. That is, as shown in FIG. 1, the longitudinal axis of the card-holding portion 14a and the longitudinal axis of the slide cam portion 14b are rotated counterclockwise with respect to the front-rear direction of the housing 11 around the stopper butting portion 14h, which is the acting point of reaction to the biasing force received from the stopper portion 11h.

A side surface of the stopper portion 11h facing the inner side of the housing 11 is a tilt-limiting portion 11j for restricting the tilt of the slide member 14, and is a slant surface, which is inclined inward toward the insertion direction of the card 21. The tilt-limiting portion 11j is not necessarily required to be formed on the stopper portion 11h, and may be formed at any position on the housing 11.

Further, a side surface of the card-holding portion 14a, which extends forward from the rear end portion of the card-holding portion 14a with respect to the insertion direction of the card 21 and which faces the outside of the housing 11, is a tilt butting portion 14i, which butts against the tilt-limiting portion 11j when the slide member 14 tilts by a predetermined angle, whereby the tilting motion of the slide member 14 is restricted. Notably, the predetermined angle is an angle at which the engagement between the card lock portion 14d and the concave portion 23 of the card 21 is canceled.

When the slide member 14 slides in the front-rear direction together with the card 21, it slides after having returned from the tilted position; i.e., in a state in which the longitudinal axis of the card-holding portion 14a and the longitudinal axis of the slide cam portion 14b are parallel to the front-rear direction of the housing 11. In this case, the card-holding portion 14a slides along first and second slide guide walls 11m and 11n formed on the first side wall 11c to extend in the front-rear direction of the housing 11. The slide cam portion 14b slides along an outer wall surface 11k formed on the outer side surface of the first side wall 11c to extend in the front-rear direction of the housing 11 and along an upwardly projecting partition wall 11p provided on the outer side of the urging member 15 and extending in the front-rear direction of the housing 11.

Figure 3:
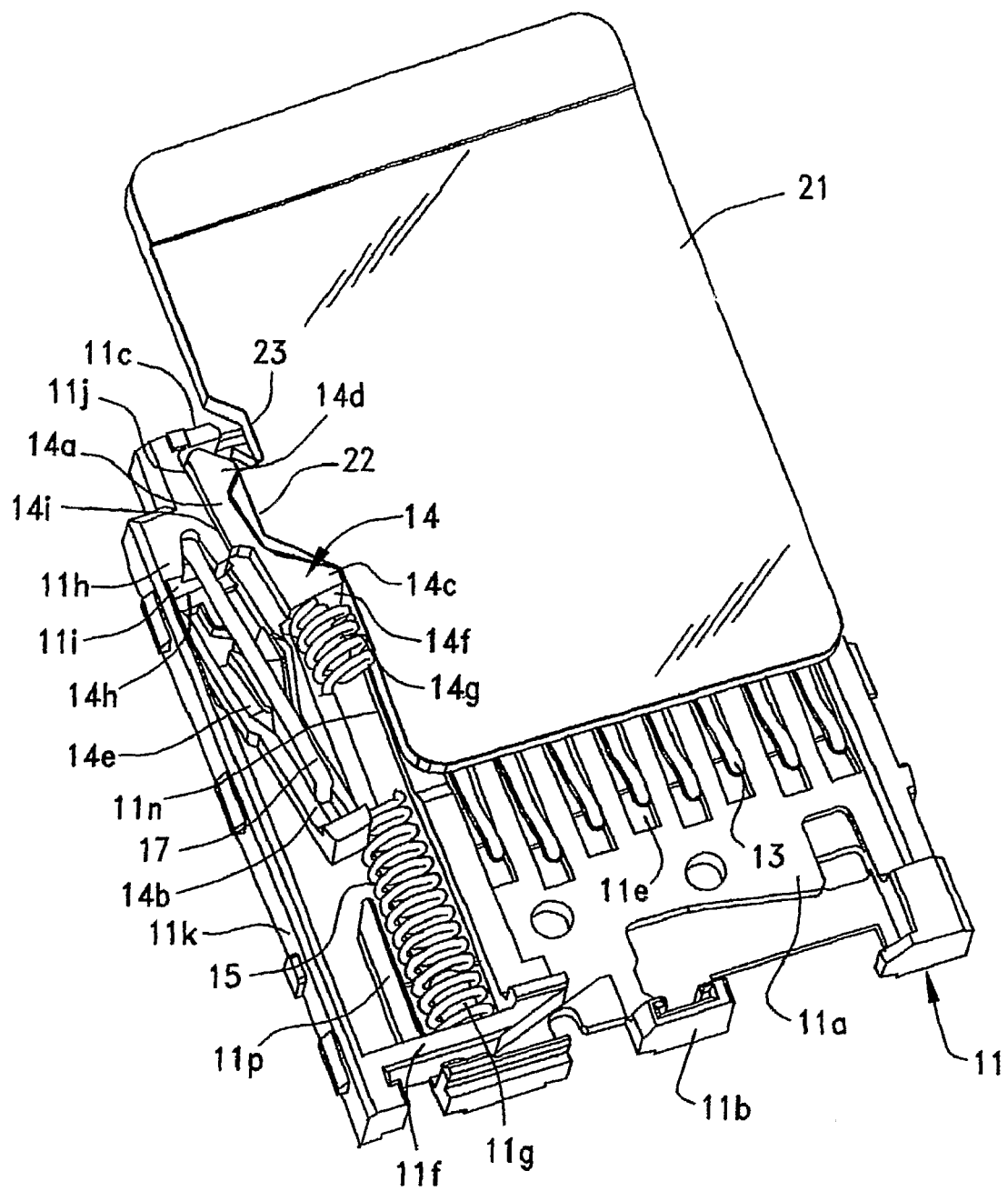
FIG. 3 is a perspective view of the card connector of FIG. 1, illustrating the memory card first inserted into the connector slot.
Figure 4:
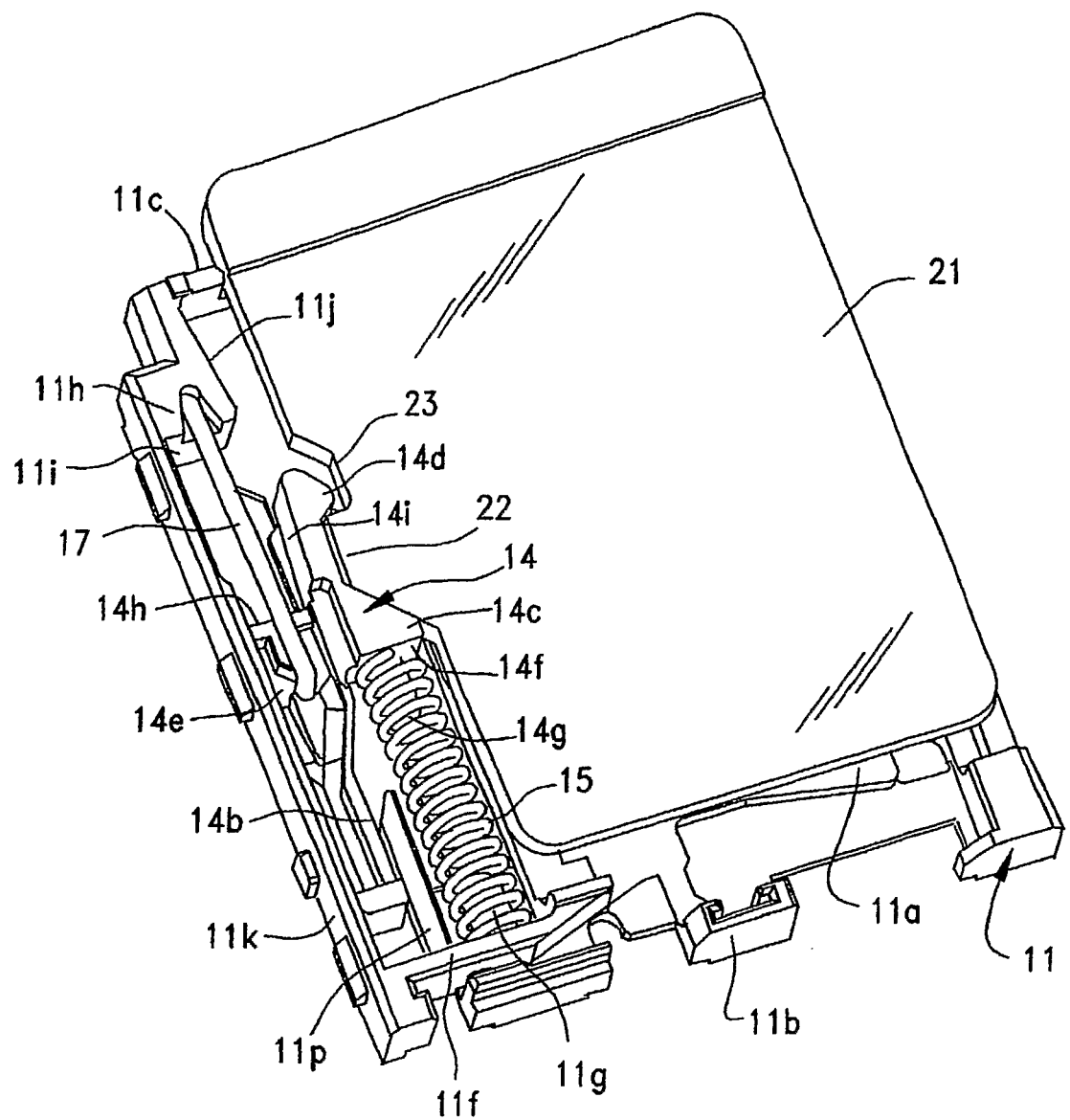
FIG. 4 is a perspective view of the card connector FIG. 1, but illustrating the memory card fully inserted into the connector slot and locked in place within the connector; and, FIG. 5 is a view showing a conventional card connector.

Next, operation of the card connector 10 will be described. FIG. 3 illustrates the memory card being inserted into the card connector and FIG. 4 illustrates the inserted memory card is at a lock position.

A user inserts the memory card 21 from the front of the card connector 10 by use of a finger or the like. When the user pushes the card 21 into the card connector 10, as shown in FIG. 3, the projecting portion 22 of the card 21, which is formed on the right side surface of the card 21 engages the card-pushing portion 14c of the card holding portion 14a. In this state, unillustrated contact pads arranged on the bottom surface of the card 21 have not yet reached the distal end positions of the terminals 13.

Subsequently, when the user further pushes and inserts the card 21, the projecting portion 22 pushes the card-pushing portion 14c toward the insertion direction of the card 21. Since the pushing force which the user applies to the card 21 is greater than the biasing force of the biasing member 15, the rotational moment which rotates the slide member 14 counterclockwise disappears. Initially, the distal end of the card-pushing portion 14c comes into contact with the projecting portion 22 and is pushed thereby, so that a rotational moment which rotates the slide member 14 clockwise is generated. Thus, the entire slide member 14 rotates clockwise and returns from the tilted position in which the slide member 14 was located in the initial state before insertion of the card 21 into the card connector 10. As a result, the longitudinal axis of the card-holding portion 14a and the longitudinal axis of the slide cam portion 14b become parallel to the front-rear direction of the housing 11.

When the slide member 14 returns from the tilted position, the tilt butting portion 14i separates from the tilt limiting portion 11j, and the card lock portion 14d moves rightward from the position shown in FIG. 3 and enters the concave portion 23 of the card 21 for engagement therewith. Thus, the card-holding portion 14a holds the card 21, with the card-pushing portion 14c and the card lock portion 14d holding the projecting portion 22 from the front and rear sides thereof, respectively. Therefore, the slide member 14 can move in the front-rear direction together with the card 21. Since lateral movement of the card 21 is restricted by means of the side walls of the shell 12, etc., the card 21 does not move rightward in FIG. 3 even when it receives a force from the card-holding portion 14a.

When the user further pushes and inserts the card 21, the card 21 moves toward the rear wall 11b together with the slide member 14. At this time, the pushing force which the user applies to the card 21 is transmitted from the projecting portion 22 of the card 21 to the slide member 14 via the card-pushing portion 14c. Thus, the slide member 14 compresses the biasing member (coil spring) 15, so that the slide member 14 and the card 21 receive an ejection force from the biasing member 15. However, since the ejection force is less than the pushing force of the user, the slide member 14 moves against the ejection force. In this case, the card-holding portion 14a slides along the first and second slide guide walls 11m and 11n formed on the first side wall 11c. The slide cam portion 14b slides along the outer wall surface 11k formed on the outer side surface of the first side wall 11c and the upwardly projecting partition wall 11p provided on the outer side of the urging member 15. The slide member 14 and the card 21 then reach the end point; i.e., the position of furthest advance, and enter a full-stroke state.

Subsequently, when the user stops the operation of pushing the card 21 and releases the pushing force applied to the card 21, because of the ejection force of the biasing member 15, the slide member 14 and the card 21 are moved in the direction away from the rear wall 11b. Subsequently, the slide member 14 and the card 21 stop at a lock position, as shown in FIG. 4, where the card 21 is held within the card connector 10 in a locked state. This is because the pin member 17 engaged with the cam groove 14e of the slide cam portion 14b comes into engagement with a portion of the cam groove 14e so as to stop the movement of the slide cam portion 14b to thereby stop the slide member 14 at the lock position.

The card 21, when held in the lock position, can transfer data to, or receive data from, computation means or the like of the electronic device to which the card connector 10 is attached. When the card 21 is held in the lock position, the contact pads of the card 21 are in contact with (i.e., electrically connected to) the distal end portions of the terminals 13.

Next, an operation of ejecting and removing the card 21 from the card connector 10 will be described.

In this case, when the user pushes the card 21 inward by use of a finger or the like, the slide member 14 and the card 21 are moved from the lock position toward the rear wall 11b, and then reach the end point; i.e., the position of furthest advance, and enter a full-stroke state.

Subsequently, when the user stops the operation of pushing the card 21 and releases the pushing force applied to the card 21, because of the ejection force of the biasing member 15, the slide member 14 and the card 21 are moved in the direction away from the rear wall 11b, so that they return toward the lock position. In this case, the ejection force of the urging member 15 serves as a pushing force, which is transmitted to the projecting portion 22 of the card 21 via the card-pushing portion 14c. Even when the slide member 14 reaches the lock position, the pin member 17 engaged with the cam groove 14e of the slide cam portion 14b does not come into engagement with a portion of the cam groove 14e, so that movement of the slide member 14 is not restricted, and the slide member 14 is not stopped at the lock position. Therefore, the slide member 14 and the card 21 move further in the direction opposite the insertion direction of the card 21, while passing though the lock position.

Subsequently, the slide member 14 and the card 21 are stopped upon butting of the stopper butting portion 14h of the slide member 14 against the stopper surface 11i of the stopper portion 11h. This state is identical with the state shown in FIG. 3. Meanwhile, the biasing force receiving portion 14f of the slide member 14 continuously receives the ejection force of the biasing member 15. Further, the stopper butting portion 14h and the urging force receiving portion 14f are offset from each other. Therefore, a rotational moment which rotates the slide member 14 counterclockwise as viewed from above is generated, and the slide member 14 is rotted counterclockwise, so that the slide member 14 is tilted.

When the slide member 14 tilts in the manner, the card lock portion 14d moves leftward as viewed from above, and disengages from the concave portion 23 of the card 21, whereby the engagement between the card lock portion 14d and the concave portion 23 is canceled. The tilting motion of the slide member 14 is restricted to the predetermined amount through engagement between the tilt butting portion 14i of the card-holding portion 14a and the tilt-limiting portion 11j of the stopper portion 11h. Notably, the predetermined angle is an angle at which the engagement between the card lock portion 14d and the concave portion 23 of the card 21 is canceled as shown in FIG. 3.

As a result of cancellation of the engagement between the card lock portion 14d and the concave portion 23 of the card 21, the card 21 is released from the holding by the card-holding portion 14a, and can be separated from the slide member 14. Therefore, the user can easily remove the card 21 by pulling it by use of his/her fingers.

As described above, in the present embodiment, the slide member 14 includes the card-pushing portion 14c which comes into engagement with the card 21 and transmits pushing force thereto, the card lock portion 14d which comes into engagement with the concave portion 23 of the card 21, the urging force receiving portion 14f on which the urging force of the urging member 15 acts, and the stopper butting portion 14*h* which comes into engagement with the stopper portion 11*h* of the housing 11 so as to stop movement of the slide member 14 toward the direction opposite the insertion direction. The card-pushing portion 14*c*, the card lock portion 14*d*, the urging force receiving portion 14*f*, and the stopper butting portion 14*h* are formed integrally with the slide member 14, and the biasing force receiving portion 14*f* and the stopper butting portion 14*h* are offset from each other. Further, the slide cam portion 14*b* is formed integrally with the slide member 14.

Therefore, when the card 21 is ejected, the slide member 14 can release the card 21 from a held state, without use of a separate mechanism for canceling engagement between the slide member 14 and the card 21. Further, it becomes possible to simplify the structure, reduce cost and size, and facilitate removal of the card 21.

Further, when the slide member 14 stops movement toward the direction opposite the insertion direction of the card 21 as a result of engagement of the stopper butting portion 14*h* with the stopper portion 11*h* of the housing 11, the slide member 14 tilts and releases the card 21 from the held state. This is because the stopper butting portion 14*h*, which is the acting point of reaction to the urging force received from the stopper portion 11*h*, is positioned lateral to the biasing force receiving portion 14*f*, which is the acting point of the biasing force received from the biasing member 15, with respect to the acting direction of the biasing force of the biasing member 15, whereby a rotational moment is generated. Therefore, the card 21 can be released without fail through utilization of the biasing force of the biasing member 15.

The tilting motion of the slide member 14 is restricted by the tilt-limiting portion 11*j*. Therefore, the tilt angle of the slide member 14 does not exceed an angle at which the engagement between the card lock portion 14*d* and the concave portion 23 of the card 21 is cancelled, whereby the slide member 14 can maintain a predetermined posture. By virtue of this configuration, even when the card 21 is again inserted into the card connector 10, the card lock portion 14*d* can come into engagement with the concave portion 23 of the card 21 without fail, and the slide member 14 can reliably hold the card 21.

The present invention is not limited to the above-described embodiments. Numerous modifications and variations of the present invention are possible in light of the spirit of the present invention, and they are not excluded from the scope of the present invention.

What is claimed is:

1. A push-push style memory card connector, comprising:
   a connector housing with a memory card insertion slot for receiving a memory card therein;
   a plurality of conductive terminals supported by the connector housing for contacting the memory card when the memory card is inserted into the memory card insertion slot; and
   a memory card guide assembly for guiding the memory card inserted into the memory card insertion slot in both insertion and ejection directions, the memory card guide assembly including:
      a slide member for engaging the memory card inserted into the memory card insertion slot, the slide member being capable of sliding movement within the memory card insertion slot while engaging the memory card, and
      a biasing member for biasing the slide member in an ejection direction, the ejection direction being opposite to the insertion direction,
   wherein:
      the memory card guide assembly stopping the slide member at an end point of a memory card lock position when the memory card is fully inserted in the memory card insertion slot, and
      the biasing member applying an ejection force to the fully inserted memory card along the ejection direction when the memory card is pushed past the end point of the memory card lock position, so as to eject a fully inserted memory card;
   wherein the slide member includes:
      a slide cam portion in engagement with a fixed cam,
      a card-pushing portion which engages the memory card inserted into the memory card insertion slot to thereby transmit a pushing force thereto,
      a card lock portion which engages a retention notch of the memory card inserted into the memory card insertion slot,
      a biasing shoulder on which a biasing force of the biasing member acts, and
      a stop block that engages a stop disposed on the connector housing which stops movement of the slide member in the ejection direction; and
   wherein the slide cam portion, the card-pushing portion, the card lock portion, the biasing shoulder and the stop block are formed integrally with the slide member, and the biasing shoulder and stop block are offset each other.

2. The push-push style memory card connector of claim 1, wherein engagement of the stop block with the connector housing stop occurs as the slide member moves in the ejection direction and stops movement of the memory card, the slide member tilting and disengaging from the memory card.

3. The push-push style memory card of claim 2, wherein when the slide member tilts, the card lock disengages from the memory card retention notch.

4. The push-push style memory card connector of claim 2, wherein the connector housing further includes a tilt-limiting portion that restricts tilting of the slide member.

* * * * *